May 7, 1946.  R. M. BOWIE  2,399,661
PHASE COMPARISON APPARATUS
Filed May 26, 1943  5 Sheets-Sheet 2

INVENTOR
ROBERT M. BOWIE
BY John J. Rogan
ATTORNEY

May 7, 1946.　　　　R. M. BOWIE　　　　2,399,661
PHASE COMPARISON APPARATUS
Filed May 26, 1943　　　5 Sheets-Sheet 4

INVENTOR
ROBERT M. BOWIE
BY John J. Hogan
ATTORNEY

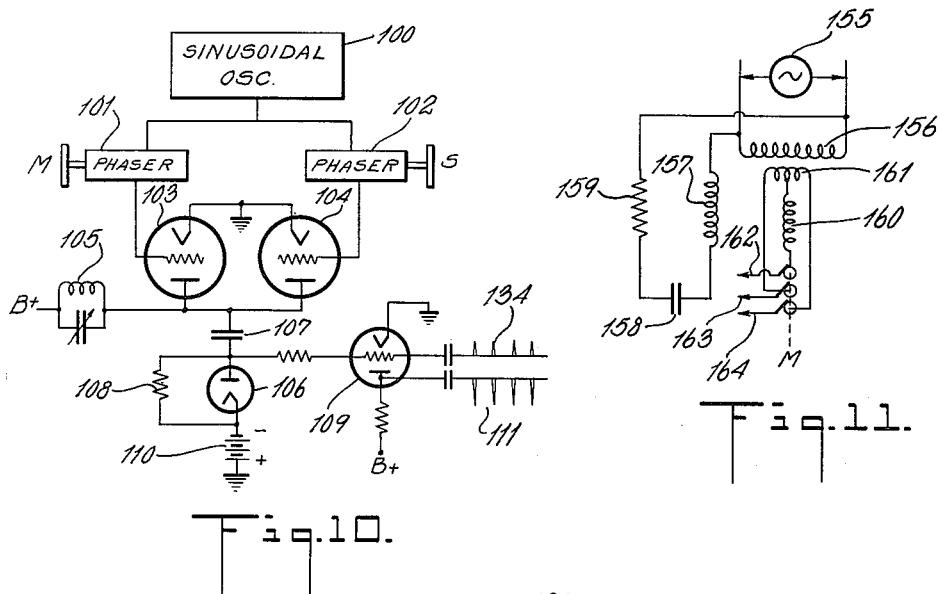
Fig.10.
Fig.11.
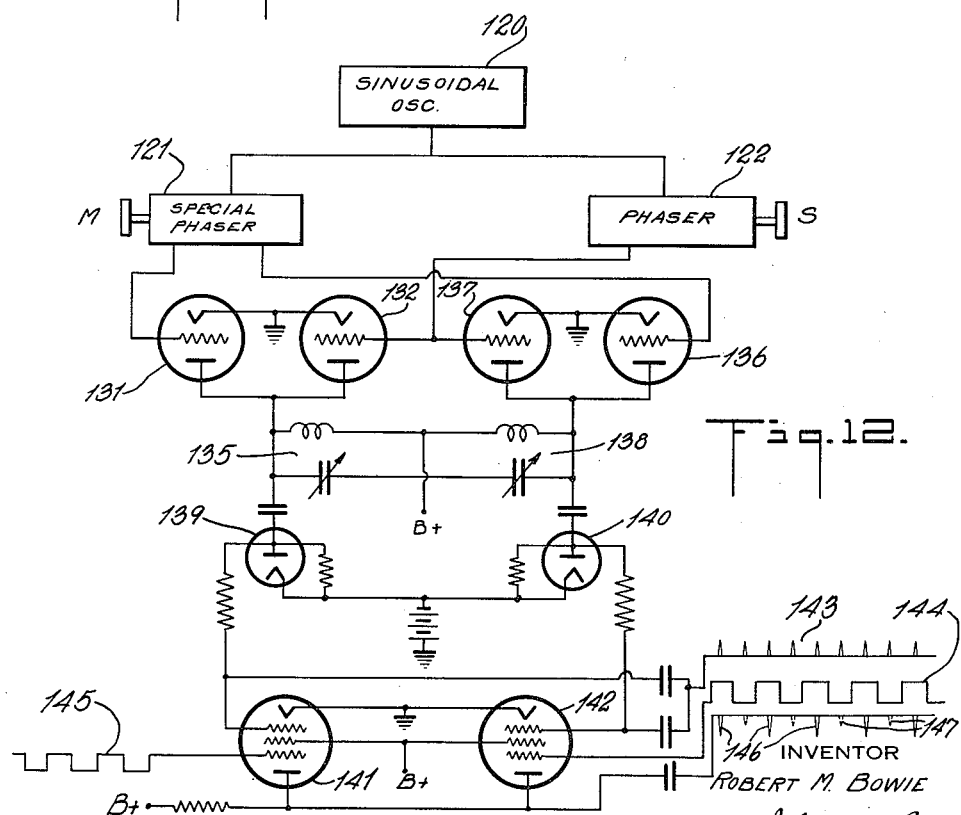
Fig.12.

Patented May 7, 1946

2,399,661

UNITED STATES PATENT OFFICE 2,399,661

PHASE COMPARISON APPARATUS

Robert M. Bowie, Emporium, Pa., assignor to Sylvania Electric Products Inc., Emporium, Pa., a corporation of Massachusetts Application May 26, 1943, Serial No. 488,498

48 Claims. (Cl. 35—1)

This invention refers to electrical signaling circuits including electron discharge tubes, and in particular, to tubes and circuits for detecting and adjusting the coincidence of a plurality of pairs of electrical quantities such as voltages, currents, and phase differences. One aspect of this invention refers to cathode ray tubes; another to the generation and detection of electrical signals and their interpretation as angles and distances.

Signals of this type are received and decoded by a certain class of radio locators known as radars, in which angles (as azimuth and elevation of an object) are directly read by adjusting the angles of directive antennae to maximum reception, and distances are obtained by adjusting the phase angle between periodically transmitted and reflected signals.

Speed and accuracy are of utmost importance in the detection and location of fast moving enemy aircraft, as this information is of no value if obtained with undue delay. Radar operators must therefore be highly trained before attaining the necessary degree of speed and accuracy for this purpose. This training can be carried out with the help of training unit, in which signals of arbitrarily chosen values, similar to those received by the actual radio locator, are produced at will and are injected into a student's operating unit on which the student performs the same manipulations as on the actual locating device and sees the same kind of display. It is, of course, desirable that a large number of pupils be trained simultaneously from a single signal source and that the nature of the signals be as realistic as possible.

The devices so far available for this purpose do not fulfill these requirements, in that the number of student stations operable from the same master or generating unit, and the number of effects attainable by the signal generator are very limited, particularly as to the simulation of reflections from several objects at different apparent azimuth and range positions. This is substantially due to the fact that these prior training units are almost entirely mechanical in their action. The invention avoids these disadvantages by the use of a completely electrical signaling equipment, which incorporates only those mechanical parts which correspond to the ones provided in the actual radio locators, such as the dials and knobs for rotating directive antennae and for adjusting phase differences.

One important circuit element in my new training unit is a cathode ray tube which is so designed that one of its circuits becomes conductive only after signals which tend to produce an arbitrarily given deflection of the cathode ray beam in two mutually perpendicular directions are compensated by similar separately controllable signals. The first named signals may be two voltages applied to one plate in each of two pairs of deflection plates. The second named signals may be two voltages applied to the other plates in each pair.

It is therefore an object of the invention to provide a tube capable of detecting a double coincidence.

It is another object of the invention to provide means for transmitting and detecting information referring to an angle.

According to a further object of the invention, means are provided for simulating to a student the type of information normally provided by a radar regarding distances to, and azimuth of, each of several objects and the effects of various spurious signals.

Another feature refers to the ease with which the new equipment can be adapted to the simulation of multiple echoes and of arbitrary noise effects similar to those occurring in actual radio locating devices.

It is still further an object of the invention to provide means whereby the student can manipulate angular adjustments and obtain the effect of the reception of a directional antenna array.

A feature of the invention refers to means for simulating to a student the effects obtained by equalizing two echo responses received by a pair of antennae which bear a slight angular displacement with respect to each other.

A further feature refers to a cathode ray tube for double coincidence detection in which means are provided for correcting errors which may result from the earth magnetic field or from other accidental fields existing in the vicinity of the detector tube, or from misalignment of the tube electrodes.

According to one feature of the invention, the external field correcting means consists in the addition of two supplementary pairs of deflection plates.

According to another feature, the external field may be compensated by locating a masked photocell in the proper position on the fluorescent screen of an ordinary cathode ray tube which may be used as a detector.

While one aspect of my invention covers the detection and generation of information concerning an angle in a radar trainer by means of D. C. voltages applied to the deflection plates of cathode ray tubes, it is also intended to cover alternate means for accomplishing those purposes (in conjunction with the training elements for determining the distances of remote objects).

These alternate means provide for the matching of phases of two waves fed over two or more different paths from a common source of high frequency oscillations, by use of circuits containing various known types of radio tubes and phasing means to be described.

Several embodiments of this part of the invention will be discussed in connection with Figs. 10, 11 and 12. One of these embodiments refers to the type of signal received with a single rotating antenna as explained in the discussion of Figs. 2 and 4. The other one is especially adapted to the reception of signals of the type referred to in Figs. 3 and 5.

The principal objects of this portion of the invention may therefore be summarized by the following features.

(1a) The development of two sinusoidal voltages, the phases of which are under the control of master and student respectively.

(2a) The addition and subsequent rectification of said sinusoidal voltage in such a way that a rectified signal is obtained which is a minimum, preferably zero, when a predetermined phase relationship exists between the two sinusoidal waves. This predetermined phase relationship may be 180°.

(3a) The control of the gain of a stage of amplification through which another signal is passed such that the strength of that output signal may be maximized by shifting the phase of one sinusoidal signal with respect to the other.

Furthermore:

(1b) The simultaneous development of two D. C. voltages in the manner just described under (1a) and (2a) above, either of which may be maximized separately by the control of the phase of one sinusoidal voltage with reference to the phase of one of two other sinusoidal voltages whose phases differ by a predetermined amount.

(2b) The control of the gain of two stages of amplification through which another signal passes in parallel, these stages also being provided with means which alternately paralyze one or another of them, since their outputs are in parallel.

My invention will be best understood by a detailed description in connection with the drawings in which:

Fig. 6 is a circuit diagram, partly schematic, of a trainer unit which is capable of simulating the signals received by two directional antennae whose response curve is given in Fig. 3.

Figs. 10, 11 and 12 refer to another embodiment of the invention in which the simulation of the azimuth operation is carried out by circuits using conventional radio tubes in place of the special cathode ray tube described in connection with Figs. 1 and 7. In Fig. 10, a basic azimuth circuit is shown which may be used in place of that used in Fig. 1. In Fig. 11, details are shown of the master phasing circuit used in the circuit of Fig. 12. Fig. 12 shows a circuit diagram of an azimuth trainer with double peaks corresponding to the circuit explained in connection with the Figs. 3, 5 and 6. In place of the special cathode ray tube shown in these earlier figures, various types of standard radio tubes are shown in Fig. 11.

Figure 1:
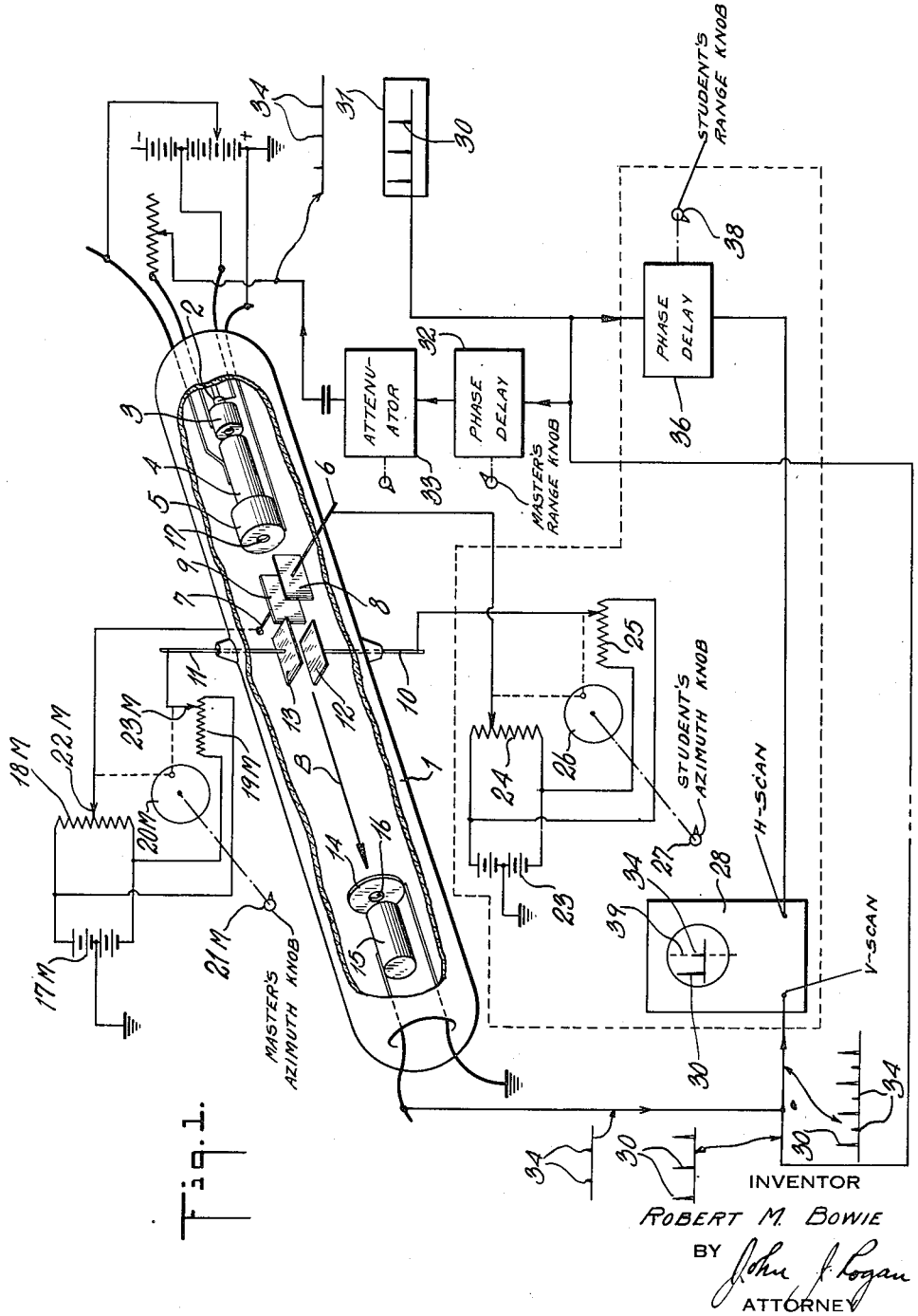
Fig. 1 is a perspective view of one type of double coincidence detecting tube with part of the envelope broken away to show the electrode arrangement and a schematic diagram of the circuits associated with the tube elements.

Referring to Fig. 1, the tube 1 is in the form of an elongated glass bulb or envelope having an electron gun mounted at one end for developing a beam of electrons. This gun may be of any construction well-known in the cathode-ray tube art and comprises, for example, an electron-emitting cathode 2, control electrode 3, first accelerating and focussing anode 4, and a second accelerating and focussing anode 5. Supported on the sealed-in wires 6 and 7 are the two spaced electrostatic beam deflector plates 8 and 9; and supported on the sealed-in wires 10, 11, are the additional set of beam deflector plates 12, 13. Plates 8 and 9 are mounted in planes at right angles to the planes of plates 12 and 13, in the well-known manner. Mounted at the opposite end of tube 1 is a centrally perforated metal plate or baffle 14, and a hollow cylindrical metal cup or collector electrode 15. Electrodes 2 to 5, 14 and 15, are mounted so that they are in axial alignment, with the aperture 16 in line with the gun aperture 17, and with the plates 8, 9, and 12, 13, symmetrically positioned with respect to the axial line between the said apertures.

When the tube is in operation, the focussed electron beam B emerging from gun aperture 17 passes between the deflector plates and strikes either the plate 14 or collector 15. When the potential on deflection plate 8 with reference to the second anode of the gun is equal to that of plate 9, the beam passing between them will remain undeflected. In like manner when the potential of the electrode 12 is equal to that of electrode 13, the beam continues undeflected in a straight line and passes through the aperture 16, thus causing an output signal from collector 15. Therefore, the described tube is capable of use as a double coincidence detector. If the potential of deflection plate 8 is not equal to that of plate 9 or if that of 12 is not equal to that of 13, no output signal is released from collector 15. It should be further noted that when the beam B is passing through the aperture 16, it is possible to transmit intelligence along the beam B to the collector 15 under control of grid 3. The beam may, for instance, be modulated by code or by impulses of any desired shape.

The tube as just described, when associated with certain circuits, may be used to indicate the coincidence of an angle setting on the control dial of one circuit, with an angle setting on the control dial of another circuit. For this purpose, any arrangement may be used which automatically produces pairs of voltages in response to an angular dial setting, which are proportional to the sin and cos of that angle. In the embodiment of Fig. 1, this is accomplished by impressing the voltage from battery 17M across the potentiometers 18M and 19M. A crank arrangement 20M actuated from the master azimuth knob 21M, causes contacts on the two potentiometers to be positioned according to the sin and cos of the angle set on the azimuth knob. In this way, the two desired voltages with reference to the second anode of the gun are supplied to deflection plates 9 and 13. At the student's position, indicated by the dotted line 1, a similar arrangement of battery 23, potentiometers 24 and 25, and crank 26 is provided. For obtaining the desired double coincidence, the student rotates his azimuth knob 27 until the potentials on plates 8 and 12 are equal to those supplied by the master to plates 7 and 13. At this setting of the angle of the student's azimuth knob beam, B will pass through the aperture 16. The current collected by catcher 15 may be indicated on an oscilloscope 28 as shown in Fig. 1, or by a microammeter or other indicating device.

Figure 2:
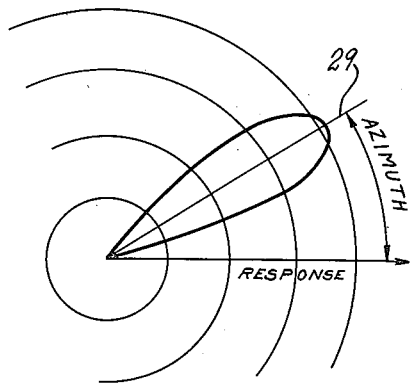
Figs. 2 and 3 show response curves obtained from two kinds of directional antennae.

Inasmuch as the diameter of beam B and the diameter of the aperture 16 are of finite size, there is a range of angles over which current may be collected at collector 15. If this current is plotted as a function of the student's azimuth setting, a diagram as shown in Fig. 2 is obtained when the azimuth of the master dial is fixed at the value indicated by 29 in Fig. 2.

In view of the similarity between the curve just described in connection with Fig. 2, and that obtained from a directional antenna of a radar, the usefulness of this tube and circuit arrangement in training radar operators becomes clear. The azimuth of a fictitious object can be set on the master azimuth dial 21M and may be detected by the student by rotating his azimuth knob 27.

In the operation of radars, usually brief periodic pulses of radio waves are transmitted, whose echoes from the field of view are received together with the originally transmitted signal. The range of each object is determined by the echo time. To simulate the effect of range, it is therefore only necessary to produce a pulse wave 30 from a suitable master oscillator 31 and apply it to a phase delay circuit 32, the delay of which is under control of the master. The output of phase circuit 32 is then fed to a suitable attenuator 33 and from there to the grid 3 of the electron gun as shown. Thus, the pulses 34 applied to grid 3 are of smaller amplitude and phase delayed with relation to pulses 30. Pulses 30 are also fed to another phase delay circuit 36 which is under the control of the student. The output of phase delay circuit 36 is used for initiating the horizontal scan on oscilloscope 28 by any well-known means. The vertical scan of the oscilloscope is derived by adding the signal reaching collector 15 to the original signal 30 thus producing a composite signal 35. The tall pulses are those produced by signal 30 and represent the directly received transmitter pulses. The interspersed smaller pulses 34 are derived from collector 15 and are variable in amplitude and position relative to the tall ones. They represent echoes. The student can now adjust the zero setting of his range scale on the oscilloscope screen by adjusting the range knob 38 so as to locate the unattenuated pulses 30 on the index mark 39 of the oscilloscope. By rotating the azimuth knob 27 he may then bring the shorter echo pulse 34 to a maximum on his oscilloscope screen, and thus determine the azimuth angle. Finally, by rotating the range knob 38 until the echo pulse coincides with the index mark, he can determine the range.

Although the description given in connection with Fig. 1 refers to a single student unit connected to the master unit and the circuit shown in Fig. 1 provides only a single echo, it is obvious that a large number of student units could be operated from a single master unit. The master unit comprises all parts marked with an M, phase delay circuit 32 and the attenuator 33. All other components, including the double coincidence detecting tube, must be duplicated at each student unit. In order to simulate multiple echoes, it is, of course, necessary to duplicate the master echo equipment for each additional echo.

Figure 3:
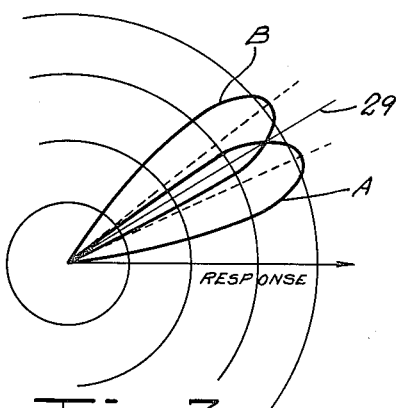
Figure 4:
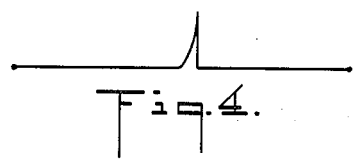
Figs. 4 and 5 show the forms of the corresponding kinds of signals appearing on an oscilloscope screen as a result of the response diagrams of Figs. 2 and 3.
Figure 5:
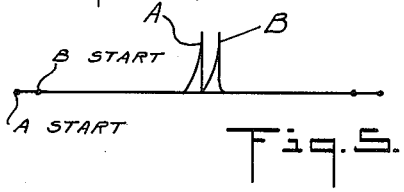

In operating the trainer unit described above, the student determines the azimuth by adjusting the response of the echo 34 upon the oscilloscope screen to a maximum. This adjustment is obtained by rotating the azimuth knob 27 back and forth about the maximum position. This operation corresponds to the determination of azimuth used in one type of radar. In other types of radars a more accurate method is used for the determination of the azimuth. Instead of a single antenna with a response such as shown in Fig. 2, the more accurate method provides two antennae displaced from each other by a small angle and rotatable as a unit. The response diagram of this arrangement is shown in Figs. 3 and 5. The intensity response of one antenna is given by curve A, that of the other one by curve B of Fig. 3. In this type of reception, it is customary to receive alternately upon one antenna and then upon the other. Assume that an object in the direction indicated by line 29 in Fig. 3 has been located. Following the wave pulse transmitted at a certain instant an echo is received on antenna A corresponding to a point on lobe curve B. The relative sizes of the two responses are then compared by the operator by the means described in connection with Figs. 5 and 7. By rotating the assembly as a unit, it is possible to equalize the responses received by the two antennae A and B. For equal response on the two antennae, the object lies along the line bisecting the angle defined by the maxima of the lobe curves A and B in Fig. 3. For determining the equality of the two responses, reference is now made to Fig. 5 which represents a view of the oscilloscope screen. Consider the instant of time when a signal is received on antenna A, and assume that the corresponding scan on the cathode ray tube screen started at the point marked "A start" and progressed towards the right, producing the peak mark A in Fig. 5 when the echo is received. When the antenna switch is shifted to receive from antenna B, a small fixed D. C. voltage is applied to the horizontal deflection plates in the oscilloscope so that the corresponding scan starts a "B start" and progresses to the right giving the slightly displaced peak mark B when the echo is received on antenna B. This process of switching antennae repeats itself indefinitely. Accordingly, the two peak marks, A and B, appear stationary and close to each other on the screen and their relative height may be changed by merely rotating the antenna assembly. When the heights of A and B appear equal on the oscilloscope screen, the antenna assembly is directed towards the object.

To achieve this effect in a radar trainer according to the invention, it is necessary to devise means for quickly changing the two voltages which are applied to the electrodes 8 and 12 of the tube shown in Fig. 1. One way of doing this would be to use, at the student unit, two sets of sinusoidal potentiometers ganged together but displaced by a slight angle with respect to each other and to provide rapidly operating mechanical switches. This, however, is impractical because the rate of switching is too high for mechanical contacts. It is possible, however, to avoid mechanical switching altogether, and to obtain the desired effect by a method based on certain properties of the sin and cos of the sum and difference of two angles. Take the well-known relation:

$$\cos(\theta \pm \Delta\theta) = (\cos\theta \cdot \cos\Delta\theta) \mp (\sin\theta \cdot \sin\Delta\theta)$$

If $\Delta\theta$ is a small angle, the above formula yields the approximation:

$$\cos(\theta \pm \Delta\theta) = \cos\theta \pm \Delta\theta \sin\theta$$

In like manner, it can be shown that $$\sin(\theta \pm \Delta\theta) = \sin\theta \pm \theta \cos\theta$$

Therefore, in order to achieve the desired shifting of angle, it is only necessary to add to and then to subtract from the voltage representing cos $\theta$ a small voltage which is proportional to sin $\theta$, as $\Delta\theta$ is a small constant. The sine voltage applied to the other plate is manipulated correspondingly. One arrangement for achieving these results is shown in Fig. 6, wherein parts corresponding in function to those in Fig. 1, bear the same designation numerals. In addition to the parts of Fig. 1, there are shown in schematic form, apparatus and circuit connections for adding to the voltage applied to the plates 8, 9, 12 and 13 of tube 1, two other small voltages, namely $\pm \Delta\theta \cos\theta_M$ and $\pm \Delta\theta \sin\theta_M$. For this latter purpose, the crank 26 also controls a movable tap 40 which supplies a voltage sin $\theta$ to the electronic switch 44. At the same time, there is delivered over contact arm 22M a voltage —sin $\theta$ to the electronic switch 46. The switches 44 and 46 are controlled by respective square-wave signals 54, 55, derived from the same master oscillator source 31 but are 180 degrees out of phase. For this latter purpose, a portion of the output of the phase adjuster 36 is changed in frequency by a frequency divider D to one-half the input frequency as described for example in application Serial No. 453,367, filed August 3, 1942. These divided frequency waves are then passed through a wave shaper SH to convert them into square waves as indicated. A portion of the output of device SH is applied to switch 44. Another portion is applied to an inverter IN whereby the output waves of the inverter are displaced 180 degrees with respect to the input waves. As a result, the switches 44 and 46 are alternately conductive and produce a series of waves corresponding respectively to $\Delta\theta \sin\theta$ and $-\Delta\theta \sin\theta$. These latter signals are then impressed upon the plate 9 of the tube 1 together with the cos $\theta_M$ waves directly from the potentiometer 19M so that the resultant voltage applied to plate 9 is cos $(\theta_M \pm \Delta\theta)$. Likewise, the potentiometer 19M feeds another pair of electronic switches 44a, 46a, similar to switches 44 and 46, switches 44a and 46a being also fed with signals 54 and 55, with the result that there is applied to the plate 13 of the tube 1 signals represented by $\mp \Delta\theta \cos\theta_M$ as well as the direct signal sin $\theta_M$. The resultant signal on plate 13 is therefore sin $(\theta_M \mp \Delta\theta)$. The resultant signals applied to plates 9 and 13 as above described reproduce the conditions corresponding to a shifting of an angle of a pair of directional antennae of a radar device as described above in connection with Figs. 3 and 5.

Figure 7:
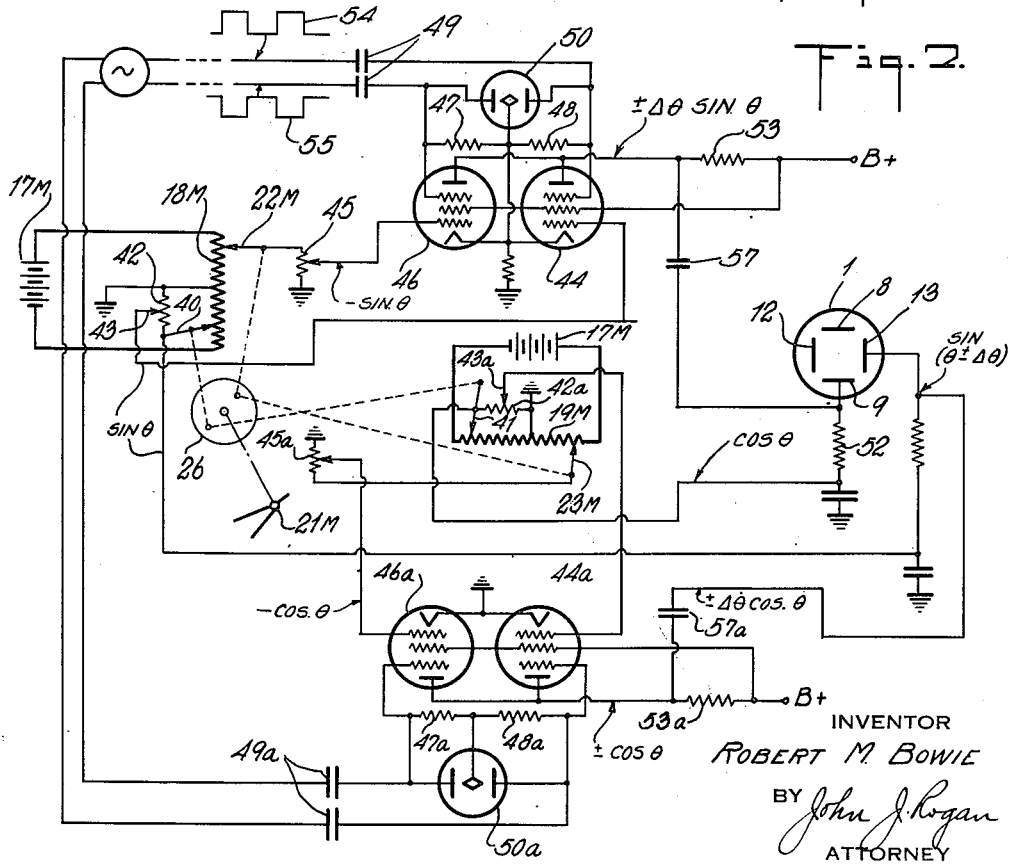
Fig. 7 is a more detailed circuit diagram of part of Fig. 6.
Figure 9:
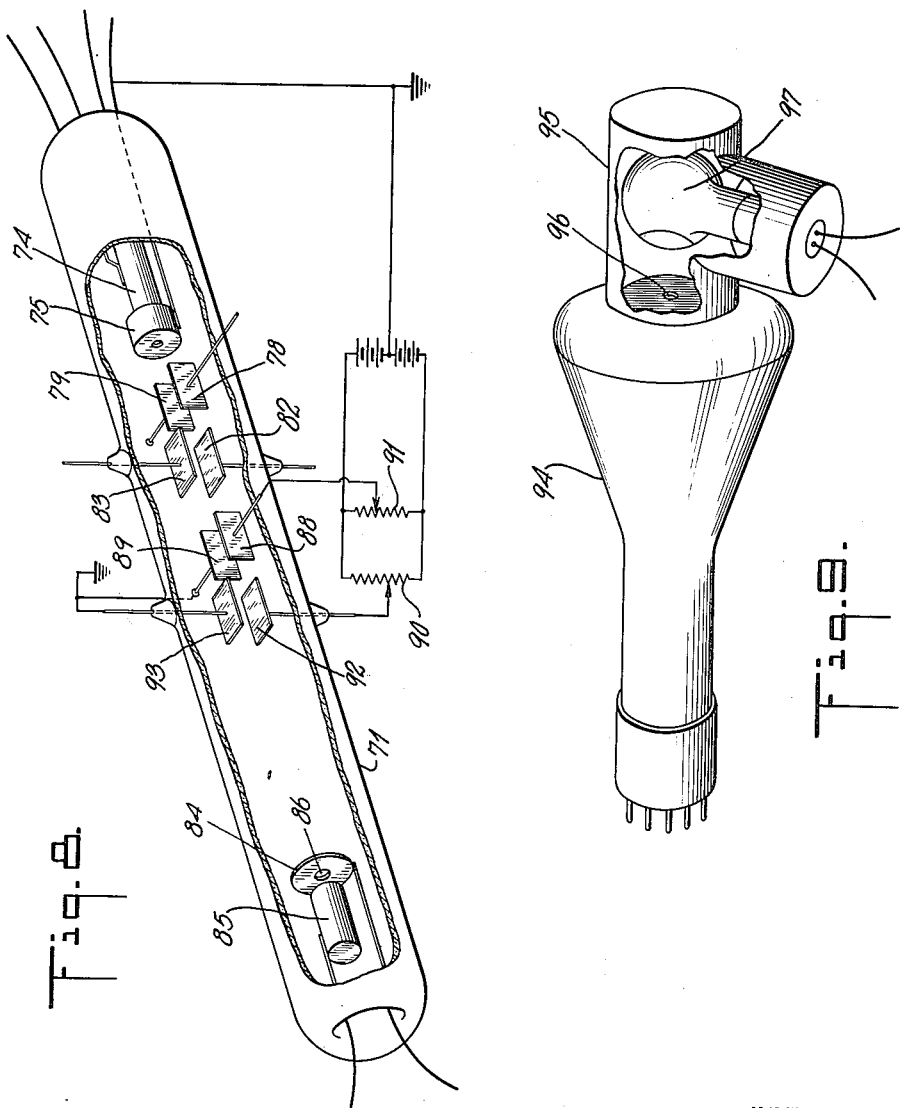
Fig. 9 shows another arrangement of tubes which can be used for manipulating an ordinary cathode ray tube with fluorescent screen as a double coincidence detector in cooperation with a movable masked photocell whose position on the screen may be adjusted for correcting the effect of external fields.

Fig. 7 shows in somewhat more detail the circuit connections for controlling the pair of electronic switches 44 and 46 under control of the "sin" potentiometer 18M with its crank 26. The crank 26 in addition to varying the main "sin" and "cos" arms 22M and 23M also varies another pair of arms 40 and 41. The arm 40 is connected to a high resistance potentiometer 42 and from thence through potentiometer arm 43 to the control grid of a pentode 44 which acts as one of the electronic switches. This applies a voltage sin $\theta$ to the control grid of tube 44. Another voltage tapped off by contact 22M and proportional to —sin $\theta$ is divided by a high resistance potentiometer 45 and is fed to the control grid of pentode 46. Either one or the other of these tubes is caused to become conducting by the application of the square waves 54, 55, (Fig. 6) to their respective suppressor grids. Fixed maximum potentials of the suppressor grids (with respect to the cathode) are determined by means of resistors 47 and 48, condensers 49, and double diode 50. When tube 46 is conducting, a small voltage proportional to sin $\theta$ is added through condenser 51 to the undivided voltage proportional to cos $\theta$ from arm 41, as a result of the action of resistors 52 and 53. When the tube 44 is conducting, the added voltage is proportional to —sin $\theta$. The square waves 54 and 55 which alternately energize tubes 44 and 46 are derived from the same source 31 but are 180 degrees out of phase. Both are synchronized with the signal supplied to the terminal "H-scan" on the oscilloscope of Fig. 1 but at half its frequency as described in connection with Fig. 6. It is this half frequency synchronizing signal which also introduces the small D. C. voltage referred to in connection with Fig. 9. Thus the shifting of the angle coincides in time with the initiation of the scan. It will be understood that while Fig. 7 has been described in detail for producing the oscillation about cos $\theta$, the oscillation about sin $\theta$ is likewise effected and the corresponding portions of the circuit bear the same numerals with the added letter $a$.

Figure 8:
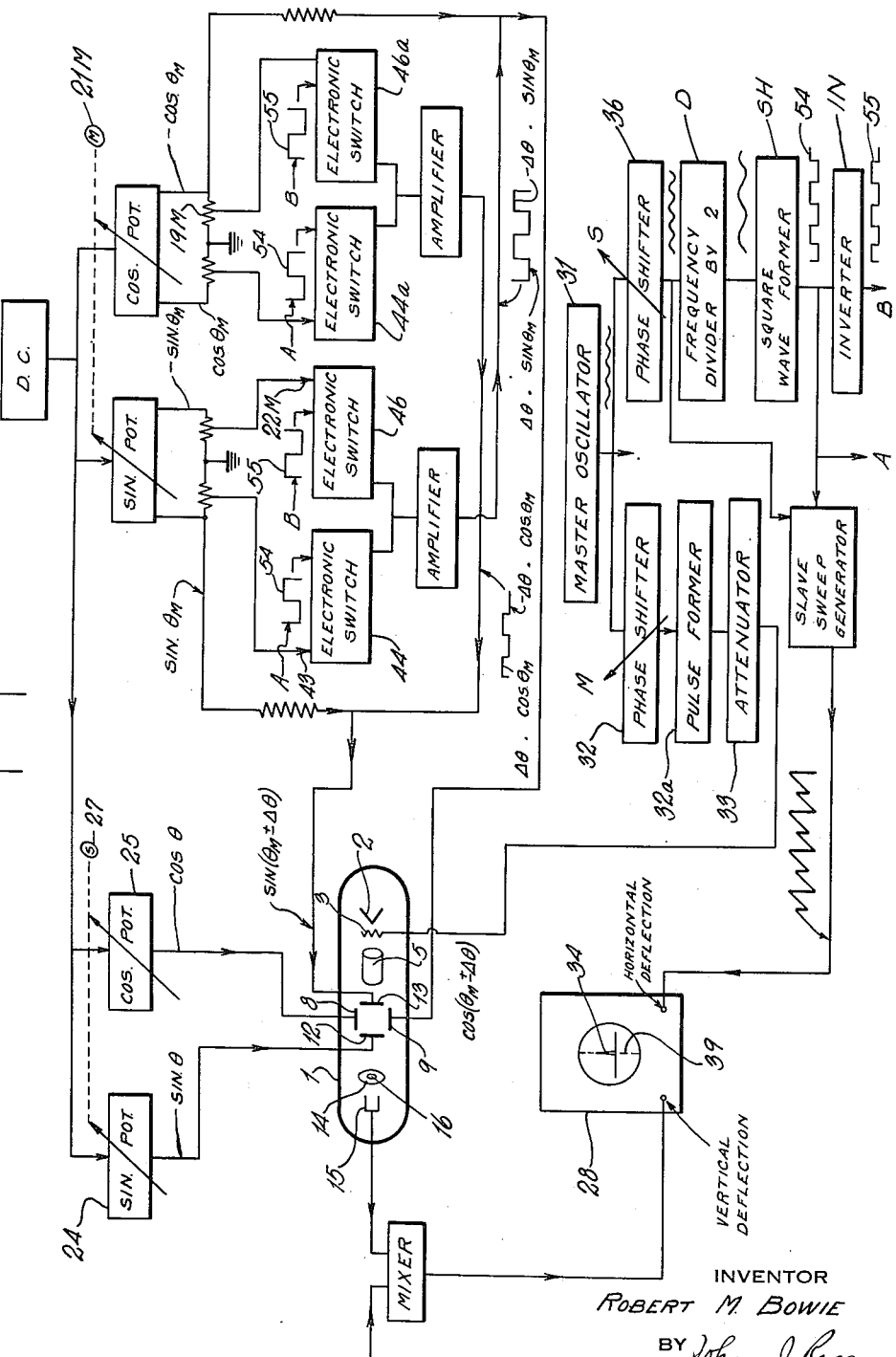
Fig. 8 shows a double coincidence detector tube in which compensating deflection electrodes are provided for correcting errors due to external fields.

Fig. 8 shows a tube whose construction is substantially the same as that of the tube shown in Fig. 1, but in addition to the double part of plates 78, 79, and 82, 83, which correspond to the previously discussed deflection plates 8, 9, 12 and 13, two additional pairs of deflection plates 88, 89, and 92, 93, are incorporated in the tube of Fig. 8. The second set of deflector plates 88, 89, 92, 93, is used to compensate for errors due to misalignment of the tube electrodes or due to weak magnetic fields such as that of the earth. If all deflection plates in either Fig. 1 or Fig. 8 were grounded, it is quite possible that the electron beam would not strike exactly the center of baffle electrode 14 or 84 because of the possible slight misalignment of the tube electrodes or as a result of external fields. While in the description made in connection with Fig. 1, no means have been mentioned for correct centering of the beam, attention should now be called to the fact that in practical operation it is necessary to employ external correcting means in connection with the tube of Fig. 1. They may consist of a permanent magnet or of two sets of orthogonal coils, each provided with a separate current adjustment. In the special tube shown in Fig. 8, the necessary corrections for misalignment and external fields are made by means of the auxiliary electrostatic deflection plates 88, 89, 92, 93. Centering of the beam of the tube shown in Fig. 8 is obtained as follows: With the plates 78, 79, 82, and 83 grounded to the second anode, potentiometers 90 and 91 are adjusted simultaneously until the current collected by catcher 85 reaches a maximum. No further adjustments of potentiometers 90 and 91 are necessary so long as the external fields do not vary appreciably.

Instead of using the arrangement of the tube shown in Figs. 1 and 8, a double coincidence detector arrangement can also be obtained by using a standard cathode-ray tube of the type used, for instance, in television, in conjunction with a photocell. This arrangement will now be explained in connection with Fig. 9 in which numeral 94 indicates an ordinary cathode-ray tube provided with two dimensional or coordinate scanning means and preferably with means for modulating the electron beam. As can readily be understood, in the absence of scanning potentials, the fluorescent signal appearing on the screen of the cathode-ray tube in response to the stationary electron beam will be located at a fixed point near the center of the screen when the deflection plates of each pair are at the same D. C. potential. In the absence of external fields, and if the electrodes of the tubes are perfectly aligned, the spot will appear exactly at the center of the screen. The aperture 96 of housing 95 which is made of opaque material, is now placed on the center of the fluorescent screen, where the bright spot appears. The light penetrates from the bright spot through aperture 96 and is received by the photocell 97 whose electric response may be used to release a relay or to give a direct signal in an associated circuit (not shown in the figure). Photocell 97 will only receive light when the spot on the cathode-ray tube screen is at or very near to its center. If the spot is not at the center of the screen, the photocell will not respond. This will happen if the voltages applied to the deflection plates of one or both pairs are not equal. The arrangement of Fig. 9 also gives a simple method of compensating for external fields or for misalignment of the tube elements. This adjustment can simply be carried out by removing all deflection signals and then moving the housing 95 over the face of the cathode-ray tube screen until the current from photocell 97 reaches a maximum. The housing is then clamped in this position by means not shown in the figure.

Instead of simulating the azimuth operations by the means of Fig. 1, a modified form is shown in Fig. 10. Referring now to Fig. 10, sinusoidal oscillations of any predetermined frequency from source 100 are fed to two identical phasers 101, 102, of the type described, for instance, in my copending application Serial No. 435,157, filed March 18, 1942. It is essential that the output of the type of phaser employed be of constant amplitude but of phase variable throughout any number of degrees. The shaft which adjusts the phase shift of one of these phase shifting devices is controlled by the master operator and its angular position represents the azimuth of an object on a plane. This shaft is marked M in the figure. The position of a similar shaft marked S in the figure is controlled by the student and it is by means of this control that he attempts to match the setting of the master operator.

The output signals of the two phasers may be added in any of several different ways. I have chosen two parallel triodes 103 and 104 which are operated on the linear portion of their characteristics. When the signal on the grid of tube 103 is 180 degrees out of phase with that on the grid of tube 104, no alternating current passes through the combined load circuit 105 and hence no voltage is developed. For all other phasing conditions, however, the currents through tubes 103 and 104 do not cancel but will result in a finite current of an amount depending upon the phase difference which produces an alternating voltage across load circuit 105. This alternating voltage is rectified by tube 106 and is smoothed by the RC circuit made up of condenser 107 and resistor 108. The direction or poling of the rectifier is such that with increased A. C. voltage across load circuit 105, the bias on the grid of tube 109 is increased. A fixed bias of a suitable value is applied to the grid of tube 109 by means of battery 110. The pulse signal 134 corresponds to the signal 34 in Fig. 1. It can readily be seen that the gain of tube 109 is a function of the bias which is applied to it by the action of diode 106 and load circuit 105. Hence, the amplitude of the output pulse signal 111 is controlled by the angular setting of the student shaft S relative to that of the master shaft M. It is readily understood, of course, that the tube 109 may be a remote cut-off pentode or any other desired type of amplifier tube. By suitable selection of this tube and of bias 110, it is possible to have output signal only when the student shaft is within say ±20 degrees of the setting of the master shaft M. The amplitude of the output signal plotted against student phaser shaft angle can thus be made to resemble closely the response curve of Fig. 2.

The arrangement of Fig. 10 corresponds to that of Fig. 1 in that in both cases the student determines the azimuth by maximizing the height of the pulse seen on the scope. This maximum height is found by turning the student shaft S back and forth.

In order to obtain the type of display described in connection with Figs. 3, 5, 6 and 7, it is possible to make use of a circuit such as that shown in Fig. 12, although of course numerous variations are within the scope of the invention. The sinusoidal oscillations from source 120 are fed to two phasers 121, 122. The phaser 122 controlled by the student is exactly like those previously referred to. The master phaser 121 is preferably, however, of a modified design about to be described in connection with Fig. 11. The rotating magnetic field is achieved in exactly the same way as in a standard phaser. As shown in Fig. 11, the oscillator 155 provides sinusoidal voltage to the damped resonant circuit comprising resistor 159, capacitor 158 and inductance 157, which are so adjusted as to give a magnetic field at its center exactly equal to, but in phase quadrature with that produced by coils 156. These coils are orthogonal to each other and thus produce the rotating magnetic field. The pick up coil 160 comprises a relatively large number of turns. Orthogonal to coil 160 there is another center tapped coil 161 of a smaller number of turns. Because of the orthogonal relationship and the nature of the rotating magnetic field, the voltage developed across coil 160 is 90 degrees out of phase against that developed across 161, so that the voltage taken between contacts 162 and 163 is equal to but slightly phase shifted against that developed between contacts 162 and 164. This phase difference is determined, of course, by the relative number of turns in, and the sizes of coils 160 and 161. A convenient value may be 15 degrees.

Returning now to Fig. 12, the output signal of the student phaser 122 is added separately to the two output signals of the master phaser 121 by means of tubes 131 and 132, which have a common plate load 135, and tubes 136 and 137, which have the common plate load 138. Rectifiers 139 and 140 develop separate bias voltages which are determined by the plate relationships between the voltage delivered by the student phaser and each of the two voltages provided by the master phaser. These two bias voltages are supplied to the grids of two pentodes (or similar tubes) 141 and 142. Pulse signal 143 is superimposed upon the control grids of both of these tubes and in series with the previously described bias. Pulse signal 143 corresponds to signal 34 in Fig. 1. Square waves 144 and 145 modulate the suppressor grids of tubes 141 and 142 in phase opposition. Their amplitudes are so chosen as to cut off completely the tube to which they are applied during their negative cycles. Thus, tubes 141 and 142 become alternately conductive. Hence, signals 144 and 145 determine which of the two developed bias voltages shall affect the size of the output signal. As shown in Fig. 12, pulses 146 are derived from tube 142, the smaller pulses 147, from tube 141. Therefore, the bias developed on tube 141 is greater in this instance than that on tube 142, indicating that the angular position of the student shaft S is different from that of the master shaft M. The two sets of signals 146 and 147 may be displayed in the manner described in connection with Fig. 6.

The invention described herein may be manufactured and used by and for the Government of the United States for governmental purposes, without payment to me or assigns of any royalty thereon.

What I claim is:

1. A double coincidence detector comprising means to develop an electron beam, a pair of beam deflector elements for deflecting the beam in one direction, another pair of beam deflecting elements for deflecting the beam in a different direction, means to energize one element of the first pair under control of a signal from a standard source, means to energize the other element of the first pair under control of a signal from a comparison source, means to energize one element of the second pair under control of said standard source, means to energize the other element of the second pair under control of said comparison source, and means to detect when the signal from the comparison source bears a predetermined relation to the signal from the standard source.

2. A double coincidence detector according to claim 1 in which the last-mentioned means includes a collector electrode for the electron beam, and a baffle electrode located between said collector and said deflecting elements.

3. A double coincidence detector according to claim 1, in which the last-mentioned means includes an indicating device for producing a characteristic indication when said beam, after passing said deflecting elements follows a predetermined path with respect to its path before passing said deflecting elements.

4. A double coincidence detector according to claim 1, in which the last-mentioned means includes an oscilloscope which is jointly controlled by the electron beam after passing said deflecting elements and by the phase relation between two sets of pulses which also control the said electron beam.

5. A double coincidence detector according to claim 1, in which the standard source includes means for generating two adjustable voltages, one being a function of the sine of a given angular setting, and the other being a function of a cosine of that angular setting, and the comparison source has similar means for producing sine and cosine function voltages.

6. A double coincidence detector according to claim 1, in which the standard source and the comparison source each includes a pair of potentiometers each having an adjustable tapping arm and a common operating control for simultaneously adjusting the positions of the arms to vary the potentials tapped off thereby in correlation with different angular functions of the particular angular setting of said common control.

7. In a double coincidence detector, an electron tube having means to develop an electron beam, beam deflecting plates arranged in oppositely disposed pairs, means to energize the plates of one pair under control of sine functions of the angular settings of two independently adjustable control members, and means to energize the plates of the other pair under control of the cosine functions of said angular settings.

8. A double coincidence detector according to claim 7, in which the electron beam producing means is provided with a beam-modulating electrode, and means are provided to energize said modulating electrode by pulses which are derived from a standard source, and an oscilloscope is provided and connected to said tube and to said source to produce an indication jointly controlled by the voltages impressed on said pairs of plates and the pulses impressed on said modulating electrode.

9. In an apparatus of the character described, a signal source producing a succession of pairs of impulses, means to delay the phase of one pulse of each pair with respect to the other pulse of the same pair, means to adjust the amount of said phase delay, a double coincidence detector tube having means to develop an electron beam, beam-modulating means upon which at least one of said pairs of pulses is impressed, and an oscilloscope whose deflecting system is controlled by the signal from said detector tube and by the said phase delay.

10. Apparatus for teaching the manipulation and operation of radars and the like, comprising a master's device for producing an electric signal representing azimuth settings, a student's device for producing an electric signal representing azimuth settings, a master's device for producing electric signals representing range settings, a student's device for producing electric signals representing range settings, and double coincidence detector means connected to all said devices to produce a characteristic indication when the student's azimuth and range settings correspond to the master's azimuth and range settings.

11. Apparatus for teaching the manipulation and operation of radars and the like according to claim 10, in which the double coincidence detector includes an electron tube having two sets of control members for the beam, one set being connected to the master's azimuth setting device and the other set being connected to the student's azimuth setting device, said tube having additional means for controlling the production of an output signal only when the effect of one of said sets of control members is substantially neutralized by the effect of the other set.

12. Apparatus for teaching the manipulation and operation of radars and the like according to claim 10, in which the double coincidence detector includes an electron beam tube having pairs of beam-deflecting members, one pair being energized under control of the master's azimuth signal, and the other pair being energized under control of the student's azimuth signal, and means responsive to the output of said tube to produce an indication to show the relation between the two signals.

13. Apparatus for teaching the manipulation and operation of radars and the like according to claim 10, in which the double coincidence detector includes a tube for developing a beam of electrons, deflecting means controlled jointly by the student's azimuth signal and the master's azimuth signal, said beam normally following an undeflected or axial path when the two signals are substantially alike, and means responsive to deflection of said beam to determine when said signals are unlike.

14. Apparatus for teaching the manipulation and operation of radars and the like comprising a pair of potentiometers, a master control device for simultaneously adjusting said potentiometers in accordance with a master azimuth setting to produce two voltages one corresponding to the sine of the azimuth angular setting the other corresponding to the cosine of that setting; an electron tube for developing an electron beam and having a pair of electrostatic deflector plates arranged to deflect said beam in two different coordinate directions; means to apply said sine and cosine voltages to said plates respectively; another pair of potentiometers, a student's control device for simultaneously adjusting said other pair of potentiometers in accordance with a student's azimuth setting to produce two voltages one corresponding to the sine of the student's azimuth angular setting the other corresponding to the cosine of that setting, another pair of electrostatic deflector plates in said tube also arranged to deflect said beam in said coordinate directions, and means to apply the sine and cosine voltages from the student's potentiometers to said other pair of plates respectively, and an output circuit for said tube which produces a characteristic signal when the action of the first two voltages on said beam is neutralized by the action of the second two voltages.

15. Apparatus for teaching the manipulation and operation of radars and the like, comprising a source of master electric pulses simulating the direct and echo pulse of a radar, a master's phase delay device, a student's phase delay device, said devices being independently adjustable by the master anad student respectively to simulate range settings of a radar and the like, the master's device also including an attenuator for attenuating certain of said pulses to simulate the echo pulses, a double coincidence detector tube having means which responds to electric signals representing respectively azimuth settings of a master's device and azimuth settings of a student's device, and control means in said tube upon which the said master pulses are impressed together with the echo pulses, means controlled by the output of said tube for producing an indication corresponding to said echo pulses, said indication being produced only when the master's and student's azimuth settings are substantially alike, the last-mentioned means being of a type which also simultaneously indicates when the settings of a master's and student's range setting device are substantially alike.

16. In a radar training system and the like, a master's position, a student's position, the master's position including means to develop electric signals representing azimuth settings, the student's position also including means to develop electric signals representing azimuth settings, both the master's position and the student's position each having means to produce a signal representing range settings, an electron tube having an electron emitter, a control electrode system and an output electrode, said control electrode system being connected to the master's and student's positions to cause said tube to produce an output signal which is a function of the relative settings of the master's and student's azimuth setting device, means to impress on said control electrode system a plurality of successive pairs of pulses, one pulse of each pair representing a datum signal and the other pulse representing a radio echo, and an indicator device which is connected to said electron tube so as to produce an indication only when the master's and student's azimuth settings are substantially alike, said indicator device also including means to produce a characteristic indication when the student's range setting and the master's range setting are substantially alike.

17. A system according to claim 16 in which said control electrode system comprises a pair of horizontal beam deflecting plates, a pair of vertical beam deflecting plates and a control grid, said master's position being connected to a horizontal deflecting plate and to a vertical deflecting plate, said student's position being connected to the other horizontal deflecting plate and to the other vertical deflecting plate, said control grid being connected to a source of echo pulses controlled from the master's position.

18. A system for radar training and the like, comprising a source of datum pulses, a master's position, a student's position, means at said master's position to receive said pulses to produce corresponding phase delayed pulses simulating a radio echo and representing a range setting, means at said student's position to receive said pulses and to adjustably phase delay them to represent the student's range setting, an electron tube having a control electrode upon which at least said echos are impressed, an oscilloscope having a pair of deflecting systems, one system being controlled by the output of said tube, and the other system being controlled by the student's phase-delayed pulses.

19. A system according to claim 18 in which said tube includes an electron beam deflecting system for deflecting the beam in one direction and another electron beam deflecting system for deflecting the beam in the opposite direction, one deflecting system being connected to both the master's and student's positions, other deflecting system also being connected to both the master's and student's positions, and means to produce a characteristic signal in the output of said tube when the control from the master's position on said deflecting systems is substantially equaled by the control from the student's position on said deflecting systems.

20. In a radar training system and the like, means to produce pulses simulating respectively the direct pulse from a radar transmitter antenna and the echo pulses, means to produce control voltages respresenting respectively a range setting at a master's position and a range setting at a student's position, a cathode-ray tube double coincidence detector comprising a beam deflecting system and a beam modulating system, means to energize the modulating system under control of at least said echoes, means to energize the deflecting system under joint control of a master's azimuth setting device and a student's azimuth device, and a cathode-ray tube oscilloscope connected for joint control by the output signal from said tube and by the setting of the student's range device.

21. A system according to claim 20 in which said cathode-ray tube detector comprises an additional beam-deflecting system which is adjusted to centralize the cathode-ray beam to render it independent of external stray fields.

22. A system according to claim 20 in which said cathode-ray tube detector has a fluorescent screen and the deflecting system is such that an output signal is produced on said screen only when said beam is centralized.

23. A system according to claim 20 in which said cathode-ray tube detector has a fluorescent screen and is provided with an apertured mask and light cell combination mounted adjacent the screen to produce a signal only when the cathode-ray beam is centralized.

24. In a radar training system, means to produce electric pulses representing respectively the direct pulses from a radar antenna and the echo pulses, and means to simulate the operation of a radar of the type which utilizes the overlapping field patterns of two angularly displaced antennae, the last-mentioned means including a student's azimuth setting device for deriving signals representing an azimuth to be determined, a master's azimuth setting device for deriving signals representing said azimuth setting to be determined by the student, a double coincidence electron tube detector, means to impress the said student's azimuth signals and said master's azimuth signals on the electrode system of said tube, and means to impress at least said echo pulses also on the electrode system of said tube, said tube having its electrodes arranged so that it produces a characteristic signal in its output only when the student's azimuth signal is substantially the same as the master's azimuth signal.

25. A radar training system according to claim 24 in which the master's azimuth setting device has means to vary the azimuth signal a predetermined small amount on either side of a mean setting to simulate the effect of two directional radar antennae.

26. A radar training system according to claim 24 in which a student's phase delay device is provided for receiving and delaying said pulses to correspond with the phase delay of said echo pulses, and an oscilloscope indicator is connected to the output of said double coincidence detector tube and to the student's phase-delay device whereby the student can observe when his azimuth setting corrsponds to the master's azimuth setting and also when the phase of the student's phase delayed pulses is the same as the phase of said echo pulses.

27. A radio training system according to claim 24 in which the student's azimuth setting device derives two voltages for each angular azimuth setting, one voltage being a sine function and the other a cosine function of said setting.

28. A radio training system according to claim 24 in which the student's azimuth setting device and the master's azimuth setting device each derives two voltages for its respective angular setting, one voltage being a sine function and the other a cosine function of said setting.

29. A radar training system according to claim 24 in which the master's azimuth setting device derives two voltages for each angular azimuth setting, one voltage being a sine function and the other a cosine function of said setting, and means are provided to automatically oscillate the sine and cosine functions about a mean angle to simulate the effect of oscillation of a radar double antenna.

30. In combination, an adjustable device whose setting represents the angular orientation of an object, means responsive to the setting of said device to produce at least two voltages which are related by cosine and sine functions of said orientation, a switch responsive to at least one voltage to control the oscillation of the sine voltage about a mean value, another switch responsive to at least one other voltage for oscillating the cosine function about a mean value, and a common detector circuit connected to both switches for producing a signal which is controlled jointly by the two oscillated voltages.

31. The combination according to claim 30 in which each of said switches is an electronic switch, and means are provided to render the switches alternately conductive in predetermined timed relation.

32. In combination, an adjustable device whose setting represents the angular orientation of an object, a potentiometer for deriving a sine function voltage of said orientation, another potentiometer for deriving a cosine function voltage, both said potentiometers being operated jointly by said device, electron switch means connected to the sine function potentiometer for producing an oscillation in the value of said sine function, other electron switch means for producing an oscillation in the value of said cosine function, a second adjustable device, a sine function potentiometer and a cosine function potentiometer for producing sine and cosine voltages corresponding to the angular setting of said second device, and a double coincidence detector upon which the voltages from all said potentiometers are applied to determine when the setting of the second device corresponds to the setting of the first device.

33. The combination according to claim 30 in which each of said switches is in the form of a pair of grid-controlled electron tubes, and a source of timing waves is connected to each pair of said tubes whereby the tubes of each pair are alternately rendered conductive.

34. The combination according to claim 30 in which each switch comprises a grid-controlled electron tube, means to apply a portion of the sine function voltage to a grid of said tube to produce an output voltage proportional to said sine function voltage, and means to combine the said cosine function voltage with said output voltage.

35. In combination, an angularly adjustable device, means responsive to a given angular setting Δθ of said device to produce a voltage represented by sin θ and simultaneously to produce another voltage represented by cos θ, a pair of electron switches, means to apply the sin θ voltage to one of said switches to produce a voltage represented by ±Δθ sin θ, means to apply the cos θ voltage to the other switch to produce a voltage represented by ±Δθ cos θ, means to combine the sin θ voltage and the ±Δθ cos θ voltage, means to combine the cos θ voltage with the ±Δθ sin θ voltage, and a double coincidence detector on which both said sets of combined voltages are applied to determine equality or lack of equality with other sets of voltages also applied to said detector.

36. The combination according to claim 35 in which each electron switch comprises a pair of grid-controlled tubes which are alternately rendered conductive by connection to a source of timing impulses, one tube of the first pair producing in its output Δθ sin θ voltage, and the other tube of said first pair producing −Δθ sin θ voltage, one tube of the second pair producing Δθ cos θ voltage, and the other tube of the second pair producing −Δθ cos θ voltage.

37. The combination according to claim 30 in which the means for producing the sine and cosine function voltages comprises a pair of potentiometers whose contact arms tap off said voltages in response to the setting of said adjustable device, each potentiometer having an additional arm for tapping off negative cosine and negative sine functions of said voltages.

38. In combination, a pair of potentiometers, a pair of slider contacts for each potentiometer, a common operating device for simultaneously moving both pairs of contacts to positions representing the angular settings of an object, the two contacts for one potentiometer deriving respectively a voltage sin θ and −sin θ, the two contacts for the other potentiometer deriving respectively a voltage cos θ and −cos θ, where θ represents said angular setting, means to combine at regularly recurrent intervals with the sin θ voltage an increment represented by ±Δθ cos θ, means to combine at regularly recurrent intervals with the cos θ voltage increments represented by ±Δθ sin θ, and a common detector upon which both said sets of combined voltages are impressed.

39. The combination according to claim 38 in which said detector comprises a cathode-ray tube having coordinate beam deflecting systems upon which said combined voltages are respectively impressed.

40. In a radar trainer or the like, a student's azimuth setting device, a student's range setting device, a master's azimuth setting device, a master's range setting device, means responsive to the student's azimuth setting device to produce sine and cosine voltages representing said angular setting, means responsive to the master's azimuth setting device to produce sine and cosine voltages representing angular settings to be ascertained by the student, the master's sine and cosine voltages being aried positively and negatively symmetrically about a mean angular value at regularly timed intervals, a master oscillator, a pair of phase shifters fed from said master oscillator, one phase shifter being controlled by the student's range device and the other phase shifter being controlled by the master's range device, a double coincidence detector tube having a set of four electrodes for comparing the student's and master's sine and cosine voltages, said tube having another electrode for controlling the output of the tube under control of the output of the master's phase shifter, and a cathode-ray tube oscilloscope having one deflection system controlled by the output of said detector, and the other deflection system controlled by the output of the student's phase shifter.

41. A radar trainer according to claim 40 in which the master's sine and cosine voltages are varied positively and negatively under control of a pair of electronic switches, each of said switches being controlled in synchronism with said master oscillator.

42. A radar trainer according to claim 40 in which the master's sine and cosine voltages are varied positively and negatively under control of a pair of electronic switches, each of said switches being connected to said master oscillator through a frequency subdivider.

43. In a phase comparison system, a source of master oscillations, a standard phaser and a comparison phaser connected to said source, each phaser having a control shaft, a pair of grid-controlled electron tubes having their input circuits connected respectively to the standard phaser and the comparison phaser, a common load device connected to the output electrodes of said tubes, and means controlled by the current in said load for producing a signal only when the shaft of the comparison phaser is within a predetermined angular setting with respect to the shaft of the master phaser.

44. A phase comparison system according to claim 43 in which the said tubes are connected to add the outputs from the two phasers, and the means for producing said signal comprises a rectifier for rectifying the load current and another grid-controlled tube whose grid is biassed under control of said rectifier.

45. A phase comparison system according to claim 43 in which the said pair of tubes are connected to the two phasers to add the outputs thereof, and the means for producing said signal comprises a rectifier for rectifying the load current and a grid-controlled tube whose grid bias is controlled by the rectified current, the rectifier and grid-controlled tube being designed so that the output signal simulates the field response of a radar antenna or the like.

46. In a phase comparison system, a source of master oscillations, a standard phaser, a comparison phaser, each being connected to said source of oscillations and each having a control shaft movable to represent azimuth settings, the standard phaser having means to produce two series of phase-displaced signals, means to combine the signals from the comparison phaser with the two signals from the standard phaser, a pair of alternately conductive electron switches, and means connecting the control electrodes of said switches to both said phasers to control the current through the switches in accordance with the angular relation between shafts of the two phasers.

47. A phase comparison system according to claim 46, in which the standard phaser comprises two stator windings energized at a phase difference of approximately 90 degrees and a pair of pick-up windings on the rotor, oriented approximately 90 degrees with respect to each other and being so connected as to give two voltages which bear a fixed phase relation.

48. A phase comparison system according to claim 46 in which the means to combine the outputs from the two phasers includes a pair of grid-controlled electron tubes whose control grids are excited respectively by the two signals from the standard phaser, and another pair of grid-controlled electron tubes whose control grids are excited in phase by the signal from the comparison phaser, a common output circuit for one of the first pair of tubes and one of the second pair of tubes, another common output circuit for the other tube of the first pair and for the other tube of the second pair, respective rectifiers for said common output circuits, and respective electron switch tubes for said rectifiers.

ROBERT M. BOWIE.